United States Patent
Mead

(10) Patent No.: US 6,561,118 B2
(45) Date of Patent: May 13, 2003

(54) FLEXIBLE MALE/FEMALE MOLD FOR CUSTOM SURFBOARD PRODUCTION

(76) Inventor: Kirby J. Mead, 8335 S. Catalina, Whittier, CA (US) 90602

( * ) Notice: Subject to any disclaimer, the term of this patent is extended or adjusted under 35 U.S.C. 154(b) by 0 days.

(21) Appl. No.: 09/905,493

(22) Filed: Jul. 13, 2001

(65) Prior Publication Data

US 2002/0031963 A1 Mar. 14, 2002

Related U.S. Application Data

(63) Continuation-in-part of application No. 09/743,760, filed on Jan. 12, 2001.
(60) Provisional application No. 60/176,136, filed on Jan. 14, 2000.

(51) Int. Cl.$^7$ .................................................. B63B 5/24
(52) U.S. Cl. ......................................... 114/357; 441/74
(58) Field of Search .............................. 114/357; 441/74

(56) References Cited

U.S. PATENT DOCUMENTS

| | | | |
|---|---|---|---|
| 3,543,315 A | | 12/1970 | Hoffman |
| 3,802,010 A | * | 4/1974 | Smith ........................... 441/74 |
| 4,129,911 A | | 12/1978 | MacDonald et al. |
| 4,753,836 A | | 6/1988 | Mizell |
| 4,964,825 A | | 10/1990 | Paccoret et al. |
| 5,023,042 A | * | 6/1991 | Efferding ..................... 156/286 |
| 5,094,607 A | * | 3/1992 | Masters ....................... 114/347 |
| 5,114,370 A | | 5/1992 | Moran |
| 5,266,249 A | * | 11/1993 | Grimes et al. ............... 114/357 |
| 5,489,228 A | | 2/1996 | Richardson et al. |
| 5,833,796 A | | 11/1998 | Matich |
| 6,224,706 B1 | | 5/2001 | Matich |

* cited by examiner

*Primary Examiner*—Stephen Avila
(74) *Attorney, Agent, or Firm*—Michael J. Hughes; Intellectual Property Law Offices

(57) ABSTRACT

Method of high-strength sandwich skin fabrication uses the thickness of a high-density foam skin core to mask minor imperfections on the surface of the mold, thereby allowing the mold to be divided into separate parts that have the capacity to be moved, then fixed and set, so as to describe different curves or modify dimensions of the board. Mold is reversible; male/female configurations permit fabrication of a wide array of custom designs. Method offers low production costs due to a rapid mold cycle, reduced labor, and efficient use of space, yet produces an exceptionally high strength, light weight board because of the increased shear strength of the monocoque perimeter rail, and the optimum fiber/resin ratio in the cored, structural sandwich skin.

6 Claims, 8 Drawing Sheets

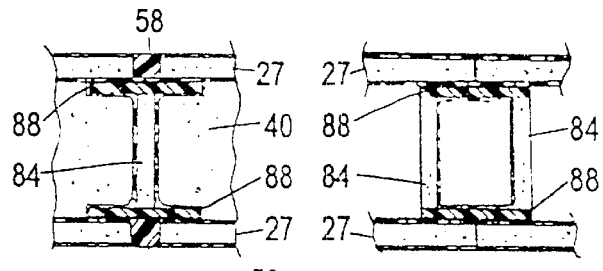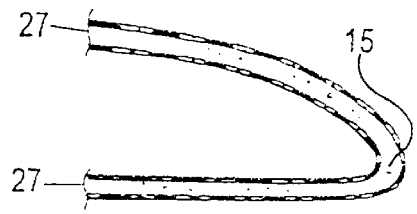
FIG. 14A  FIG. 14B  FIG. 15
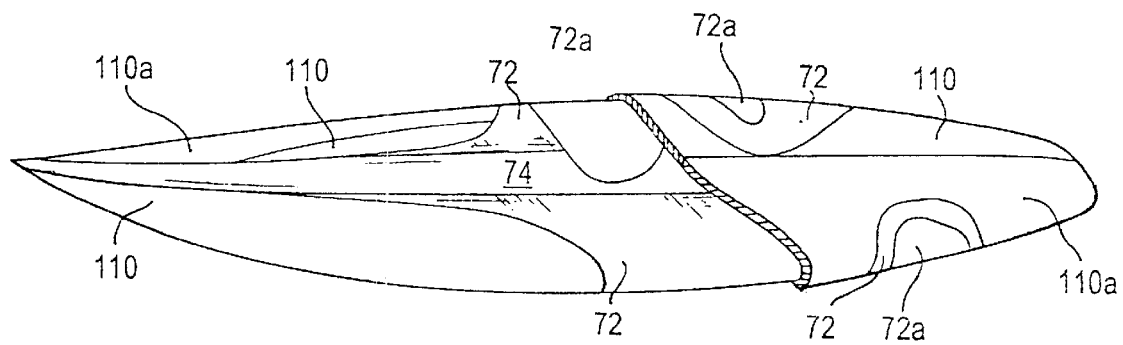
FIG. 16
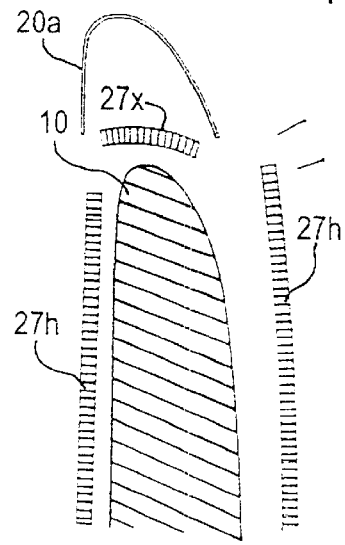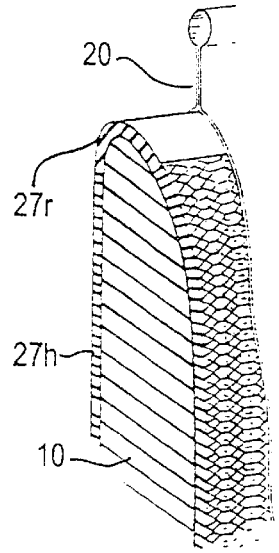
FIG. 17A  FIG. 17B

FLEXIBLE MALE/FEMALE MOLD FOR CUSTOM SURFBOARD PRODUCTION

RELATED APPLICATION

This application is a continuation-in-part of application Ser. No. 09/743,760 filed Jan. 12, 2001, which claims priority from U.S. provisional application No. 60/176,136 filed Jan. 14, 2000.

BACKGROUND OF THE INVENTION

1. Field of the Invention

This invention relates to methods and apparatus used in the design and manufacture of surfboards, sailboards or similar aquatic boards, referred to generically herein as "board" or "boards."

2. Description of the Related Art

Surfboards and sailboards are of similar shape, however the sailboard is generally manufactured in a mold, while the surfboard is fabricated using a labor-intensive moldless or custom method of construction. The conventional molds used in surfboard and sailboard construction comprise top and bottom halves that meet at the perimeter and thereby delimit an internal cavity; the concave, female surface of the mold defines the board's exterior shape, and imparts a smooth surface to the exterior skin. Currently available molded production techniques restrict the shape of the board to an exact duplicate, which generally limits molded production to the less demanding design of the sailboard. For molded surfboard production, the wide variation in size and shape requires the manufacturer to invest in a large and prohibitively expensive inventory of molds, and eliminates the many custom design modifications that are made in the prior art as a matter of routine.

a. Moldless, or Custom Board Production

The surfboard is typically constructed without a mold. The board is individually hand-shaped from a polyurethane foam blank, and the fiberglass and resin are applied by hand over the shaped foam core. The process is labor-intensive, requires considerable skill, and involves structural problems that dictate dividing the production process into two separate steps, with the foam blank supplied by a separate manufacturer.

To enhance the strength of the foam, the blank is molded in an extremely strong, heavy mold made of reinforced concrete. This allows an excess of liquid pre-foam to be poured in the mold; as the foam expands, the excess compresses under high pressure against the surface of the mold and produces a density-gradient in the blank—the foam is soft and weak in the center and becomes progressively harder and denser towards the surface. To avoid removing too much of the harder, denser surface foam during shaping, the blank is molded close-to-shape, or as thin as possible. This close-to-shape molding has the drawback of increasing the requisite number of blank molds for surfboard production, and frequently leaves insufficient foam in the nose and tail areas of the blank for the shaper to produce the desired lengthwise bottom curvature or rocker in the board.

The molded-in rocker of the blank must therefore be modified by the blank manufacturer by gluing the blank to a wooden center spar or stringer cut to dimensions specified by the customer, and usually selected from a list of stock lengthwise rocker modifications. Clark Foam of Laguna Niguel, Calif., (www.clarkfoam.com) lists in its Rocker Catalog the dimensions of over two thousand different templates available to modify the molded-in rocker curvature produced by the more than sixty blank molds offered for surfboard production. Molding the density-gradient into the foam and providing the frequent lengthwise rocker modifications are expensive but essential, because the board's ability to withstand impact and bending loads is very low.

The single fiberglass ply used on the bottom of the board will usually dent or fracture with moderate finger/thumbnail pressure, while the double or triple layer used to reinforce the deck (or top surface of the board) in the tail area where the rider stands often fatigues, becomes permeable to water, then fails and completely delaminates under the repeated high pressure of the rider turning the board. Shaping also limits the effectiveness of the longitudinal reinforcement—it makes wood the material of choice for the center spar and also makes it impractical to ad top and bottom spar caps (i.e. the top and bottom reinforcing flanges in an I-beam)—the lack of effective longitudinal reinforcement leaves thinner surfboards in particular susceptible to breakage. In custom-board production, a basic problem is the one-to-one weight ratio of skin material to interior core. Currently, enhancing the strength-to-weight ratio entails the high costs and lengthy mold cycle of a fiber-reinforced structural sandwich skin, in the more expensive of the two basic methods of molded manufacture outlined briefly below.

b. Molded Methods of Production

The rapid mold-cycle and inexpensive thermoplastic skin of a blow-molded, rotationally-molded, or vacuum-formed board generally offers lowest costs of production. The specifications of U.S. Pat. No. 5,094,607 to Masters and U.S. Pat. No. 4,065,337 to Alter et. al, which describe rotational and vacuum thermoforming methods applicable to surfboards, sailboards and other small watercraft, are incorporated herein. U.S. Pat. No. 4,713,032 to Frank, the specification of which is incorporated herein, is directed to low-cost methods in which a fiber-reinforced resin foams to fill the void between a pre-molded EPS core and the surface of the closed mold. Using quick-setting, foamed polyurethane resin in the skin, the cited invention achieves a rapid mold-cycle of about twenty minutes per board and high production from the molding tool of as many as twenty-four boards per day.

In the above methods, the strength of the fiber reinforcement is greatly reduced by the foaming of the resin matrix, or is absent altogether. Using a rotational mold, three separate charges of resin, the second of which foams, are often used to create a thicker, stronger skin "sandwich skin;" similarly, a thin sheet of PVC foam is often used as a sandwiched core between the layers of laminate to create a fiber-reinforced, foamed plastic sandwich skin.

Due to the inherent weakness of the above materials, strength-to-weight and skin-to-interior core ratios fall well below expensive, high-performance sailboards, that eliminate the blowing agent in the fiber-resin to create a much higher strength "structural sandwich" skin. The structural sandwich is expensive to fabricate because of the very long mold cycle—vacuum pressure is used to eliminate entrapped air and voids and causes the sandwich core/laminate to conform to the shape of the mold; to prevent the spring-back of the sandwich core the material remains in the mold under vacuum pressure for about two to three hours, until the resin has completely cured. The shape of the opened mold creates an additional problem—the sharp, concave edge contours tend to create a dam, and the sandwich core layer, by blunting the effectiveness of the squeegee in removing excess resin from the laminate, prevents the skin from attaining optimum strength and lighter weight.

In the interior core, EPS (expanded polystyrene) bead foam requires separate pre-molding in a steam chest, but is preferred over polyurethane foam due to its lighter weight-containing the expansion of liquid polyurethane pre-foam injected into the mold's interior generally requires an extremely strong mold, steel reinforcing jigs and a hydraulic press to prevent mold distortion or buckling under the high pressure. In prior art described in U.S. Pat. No. 5,023,042 to Efferding, the wet epoxy laminate/PVC sheet foam of the structural sandwich skin fits into molded-in recesses in the EPS core and the entire assembly is placed in the mold, the exterior of which precludes resin removal by hand. Vacuum is applied to press the components tightly together and squeeze excess resin out in the process, but the pressure is limited to about 12–15 inches of Hg to prevent the mold from distorting and the foam core collapsing. Full vacuum (27 in. Hg) may be applied using the evenly flexing upper mold half disclosed in the invention to Efferding, which eliminates distortion problems by compressing the EPS interior core evenly, creating a permanent compression set of about three sixteenths of an inch in the finished board. Internal shear webs, spars, etc. become problematic, however, as they tend to cause distortion problems to reappear under vacuum.

The high-strength obtained with expensive, thermo-setting epoxy "prepreg"/honeycomb skin-core combinations as described in U.S. Pat. No. 4,964,825 to Paccoret, et. al and U.S. Pat. No. 5,266,249 to Grimes III, et. al, the specifications of which are incorporated herein, allows the interior of the board to left largely hollow, with a longitudinal shear web/transverse bulkhead structure serving as support. Manufacture entails high material cost, a long mold cycle at high temperature, and often a high-pressure autoclave cure.

Undesirable flexural characteristics have relegated the use of resilient foams to beginner and rental boards; due in part to high production costs, boards made with a sufficiently stiff interior structure as described in U.S. Pat. No. 3,543,315 to Hoffman and U.S. Pat. No. 5,489,228 to Richardson, et. al, the specifications of which are incorporated herein, have heretofore comprised an insignificant portion of the overall market.

At the time of the present invention, the board-making arts had need of a method of high-strength board fabrication with a reduced mold-cycle to make production costs competitive with low-cost thermoplastic and fiber-reinforced foamed plastic methods outlined above. This invention allows high-strength fiber-reinforced plastic to be combined with rapidly formed thermoplastic in the skin, uses optional resilient material to absorb impact and bending loads and, by incorporating principles during manufacture that allow alterations in shape, permits the molded production of custom-shaped boards.

SUMMARY OF THE INVENTION

Embodiments of the present invention allow opposing sides of the male or female surface of a single shape-defining board mold, whether divided into top and bottom, right and left halves, or of substantially one piece construction, to produce the plurality of different board configurations necessary in the molded production of custom shaped boards. Further, because the shape of the material itself may be modified after removal from the mold, a simply constructed mold made according to the present invention may define the shape of the material in such a way that substantial modifications are possible after the shape is initially defined, so that a variety of individual flotation, planing area and performance requirements may be accommodated.

For example, in an embodiment of the present invention, vacuum thermoforming techniques may be used to mold a layer of thermoplastic material, such as a sheet of high-density plastic foam, to create a thin, arcuate foam shell in the shape of one right- or left-hand side of the board. During subsequent steps of production, as it receives a fiber-reinforced plastic skin and foam for the interior core, its width may be altered according to where excess material is trimmed to create a longitudinal centerline for the board, the tail made wider relative to the nose and vise versa, and the volume of the board may be modified according to the thickness of material used in the interior core.

Further, during molding, the thin layer of exterior skin material may be of sufficient thickness to bridge small gaps and mask minor imperfections on the surface of the mold, allowing the shape-defining mold to be divided into separate parts designed to be moved, then fixed and set so as to change dimensions, describe different curves and modify various parameters of the board's design. In the present invention, for example, the bottom panel of the mold may be designed to bend lengthwise to alter the rocker curvature of the board, the deck panel made adjustable to control thickness, a flexible rail component may be made to modify the board's outline and width; added rail segments and/or adjustable nose and nose and tail components then allow changes in length at either end. Reference for the movement and fixed attachment of the mold parts may be provided an external structure, such as a mold base, which may be placed parallel to the mold's longitudinal axis of symmetry, and/or each other.

When fixed attachment of the shape-defining subparts is to a mold base, the exterior or male surface of the mold may be used, and the mold thus configured and can accommodate virtually all the common modifications required within a particular style of board. The added compound curvature of certain design features, however, can limit the bending capacity of the affected mold panel or rail component sufficiently to make additional bending difficult if not impossible. To accommodate these design features, the mold components may be reversed and attached to an external frame, thereby creating the concave cavity of a female mold. After the rocker, thickness and various design parameters of the mold are set, foam may be molded in the cavity to produce a foam blank that, upon removal, can quickly have the desired features shaped into the foam by hand; the shaped blank then provides the (male) mold needed to form surface layer(s) that comprise the board's exterior skin. The male/female mold configurations thus allow the production of custom designs; further, the method of manufacture reduces the mold cycle of high-strength board fabrication.

For example, because the shape of the board may be defined by a layer of rapidly formed thermoplastic foam, it is also possible to vacuum thermoform an additional thin, inexpensive sheet of polycarbonate, acrylic, polypropylene etc. that serves as a mold to impart a smooth surface in a fiber-reinforced plastic skin. Combined, the two surfaces have sufficient stability for the laminated skin/female mold assembly to be removed from the expensive shape-defining mold before the resin has fully hardened, thus reducing the mold-cycle (of the shape-defining mold) to the time needed to initially pre-mold the thermoplastic material and apply the laminate, under ten minutes per side in each operation.

Structurally, molding the board in right and left halves produces a stronger, seamless monocoque rail, and allows the bond-line and its attendant reinforcement to moved away from the perimeter and placed along the longitudinal centerline of the board, where the same weight of material may be used to create a high strength composite spar that guards against board breakage. The laminate may be applied with the width of the board at right angles to the worktable, where gravity provides an effective aid in removing excess resin. The thin, flexible female surface allows substantial squeegee pressure to pass through to the laminate—unobstructed, the resin quickly runs off the smooth, vertical sides of the molded foam shell, leaving an absolute minimum within the fiber. The laminate's enhanced tensile, compressive, and flexural strength in bending may then be complemented by incorporating resilient foam into the interior core and skin, to allow the board to absorb even greater impact and bending loads without damage.

Other advantages include a more efficient use of space—the board may be positioned so that its thickness, rather than its width, occupies manufacturing area during construction and throughout the cure; this feature also makes it possible to realize major labor savings by using a mechanical fabric-impregnator to quickly pre-saturate the fiberglass cloth. It will be seen that the principles disclosed herein may be applied to a variety of manufacturing techniques and mold configurations. For example, the board mold may have a single continuous shape-defining surface, be divided into top and bottom as well as right and left halves, and incorporate male/female shape defining combinations as well as reversible male/female surfaces. It will be seen that each of these mold configurations may have particular advantages according to specific board design and manufacturing requirements, which will be more fully explained and better understood given the context provided by the detailed description of the invention, and upon viewing the drawings.

BRIEF DESCRIPTION OF THE DRAWINGS

FIG. 14A is a cross-sectional view of an I-beam spar.

FIG. 14B is a cross-sectional view of a box-beam spar.

FIG. 15 is a partial cross-sectional view of a monocoque rail of the present invention taken along the lines 15—15 of FIG. 13.

FIG. 16 depicts the positioning of the reinforcing flange used when resilient foam is incorporated into the structure of the board.

FIG. 17A is a cross-sectional view of a male/female mold configuration used with a honeycomb sandwich core to create a structural sandwich skin.

FIG. 17B is a cross-section view, partially in perspective, of the molding of honeycomb sandwich core material.

DETAILED DESCRIPTION OF THE INVENTION

Figure 1A:
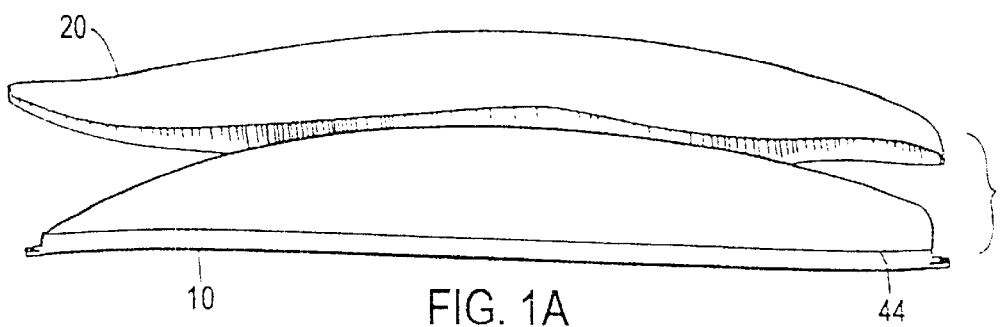
FIG. 1A is a side view of a right-hand mold half according to an embodiment of the present invention.

The following description of the invention provides an illustration of method and apparatus that will impart an understanding of the invention to a person of skill in the art. However, as will be apparent to those of skill in the art, modifications to the embodiments may be made without departing from the spirit and scope of the invention. Therefore, the description that follows is provided for illustration purposes only, and should in no way be interpreted to limit the invention, which is defined more fully and accurately in the appended claims.

To better illustrate the invention, the following discussion is divided into four parts that describe materials useful in the construction of the mold, outline principles of the mold's basic configurations and design, suggest techniques useful in thermoforming plastic material, and describe methods and materials that may be used to complete the board. For purposes of clarity, the drawings typically illustrate only one half of the symmetrical board/mold; the deck or top surface is facing the viewer and the nose is oriented to the left. The reference numeral 10 denotes the shape-defining mold and individual shape-defining subparts as a whole; like reference numerals are used to denote both right, left, male and female mold subparts.

1. Construction of the Mold

The novel molds disclosed in the present invention may be constructed from one or a combination of any of the wide variety of materials useful in the mold-making arts, including plaster, metal, rubber, foam rubber etc., and may further include synthetic plastic foam. The mold may be divided into two basic parts, and comprise a first part dedicated primarily to defining the shape of the board, and use a second female surface primarily to impart a smooth surface in the exterior skin. The shape-defining component may be made from solid material, be of unibody construction with functional convex (male) and concave (female) surfaces, or comprise one or more surfaces, subparts or a plurality of pieces. Construction of fiber-reinforced, high-heat compatible tooling epoxy composite facilitates the incorporation of different materials into the structure of the mold. For example, metal may be added to increase heat transfer, stiffen specific areas, and reinforce apertures for fastening devices, etc. Tooling epoxy composite also allows the fiber to be aligned to better accommodate an anticipated modified curvature or bend, and facilitates the fabrication of an articulated skeletal structure of segmented pieces, which may be used for example, at the perimeter rail of the mold. The tooling composite may also used with an elastomeric acrylic or silicone based rubber for a variety of purposes, including the creation of tapered, flexible fairings between individual moveable mold surfaces or subparts.

The shape-defining component may be used with a separate female mold component that, when used primarily to impart a smooth surface in the board's exterior skin, may be made from thin, inexpensive sheets of ABS (acrylonitrile-butadiene-styrene), PC (polycarbonate), PP (polypropylene) PMMA (polymethylmethacrylate), etc. molded using vacuum-thermoforming techniques and, when appropriate, subsequently trimmed in the same manner as the thermoplastic foam skin material of the board described in greater detail below. The female component may also be constructed of flexible, elastomeric silicone or acrylic rubber to allow it to conform to a variety of shapes; fiberglass may be used to create a silicone/fiberglass composite; the mold may incorporate a thin layer of plastic tooling composite to stiffen the broad, planar top and bottom surfaces of the mold, and leave the elongation of pure rubber at the rail to conform to the radius at the board's perimeter.

2. Basic Mold Configurations and Design

Turning now to FIG. 1A, when the reproduction of a popular stock board shape is a primary consideration, the mold may be constructed as shown in FIG. 1A, which gives a side view of the two basic components of one right-hand mold half. As depicted, the width of the shape-defining component 10 is oriented vertically, the top and bottom sides are normal to a worktable (not shown); the thin, flexible female component 20 is shown being fitted over the shape-defining mold 10; the scribed line 44 represents a hypothetical centerline of a molded skin core 27 (not shown in this view) of a right-hand board half. As depicted, the shape-defining component 10 may be solid, be of unibody construction and comprise a single continuous surface with functional interior (female) and exterior (male) surfaces. By incorporating an indeterminate edge between two opposing sides, the shape-defining mold 10 allows the board to be molded so its width and planing area may be adjusted according to where the centerline cut 44 is made, two thicknesses are possible by using the interior or the exterior of the shape-defining mold 10 as the shape-determining surface, and additional gradations may be made by bonding the molded exterior skin to interior core material of varied thickness. The two halves of the mold do not meet precisely at a predetermined point; the indeterminate edge makes the mold for a single popular stock shape much less expensive to construct and further, permits the board made therefrom to be tailored to accommodate a wide range of individual flotation and performance needs.

When the shape-defining mold 10 is made from a solid material, such as synthetic plastic foam, molded rubber, foam rubber or the like, its rocker curvature may be altered by causing it to conform to the shape of an external surface during the molding process; further, a plurality of different rocker curvatures are possible using an adjustable reference such as a rocker table, which will be described in greater detail below, or by providing additional shape-defining mold subparts so as to allow the shape of the mold to be modified using external or internal adjustments.

Figure 1B:
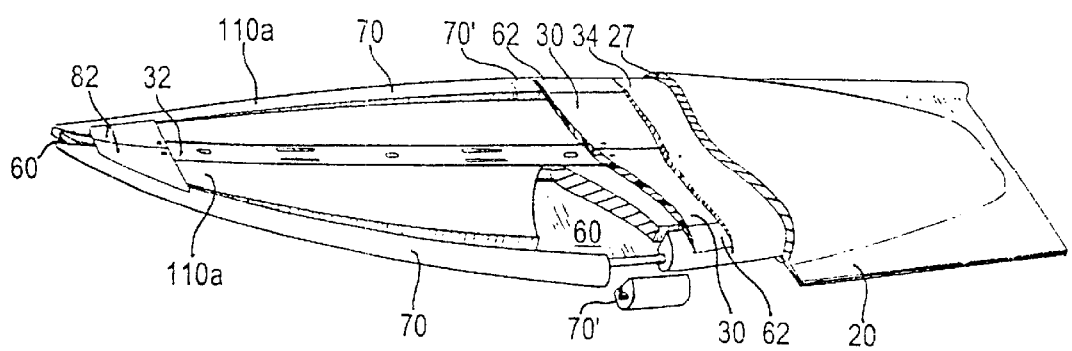
FIG. 1B depicts a one-piece male mold and provides a cutaway view of shape-defining subparts and a female surface.

Referring now to FIG. 1B, a shape-defining mold 10 is illustrated as having a solid interior core 110*a* with external and internal subparts that allow a plurality of different shapes to be described. To incorporate a modified bend along the longitudinal axis, the interior core 110*a* of the shape-defining mold 10 may be designed to be attached to interchangeable "rocker strips" 32 of the desired curvature; alternatively, the shape-defining mold 10 may be bent to the desired curvature, the attachment and bottom panel (50, not visible in this view) to the template 60 (which is interchangeable, and may also describe a rocker curvature) and the deck 30 to the (deck) rocker strip 32 then mechanically fixes the changed curvature in the same manner that glue may be used to permanently fix a bend or curvature into laminated strips of veneer or wood. The adjustable, interchangeable template 60 may also be used to position the perimeter rail 70, and thereby modify the outline and width of the board; added rail segments 70' combine with sliding adjustable nose 82 and tail blocks (92, not visible in this view) permit changes in length at either end.

Prior to molding process, the thickness of the shape-defining mold 10 may be modified by altering the volume of an internal expansion chamber (not shown) using bolts, fluid or gas filled bladders (not shown), or with a molded rubber, foam rubber, or synthetic plastic foam "blanket" 34, shown directly beneath the molded skin core 27 and the female component 20. Either surface (27, 20), or a layer of molded silicone rubber (not shown), for example, may be used as (male) spacer(s) to mold a thermoplastic material such as a female mold 20, which is depicted in this view as incorporating a molded hinge along one perimeter edge so the mold may be opened and the board removed therefrom. It will be noted that an indeterminate edge, when confined to the perimeter of the shape-defining mold 10, allows the board to be molded with upper and lower, top and bottom, or right- and left-hand sides, and that the mold may be positioned to be horizontal or with its width at right angles to the worktable, as shown in FIG. 2A, during the molding process.

Figure 2A:
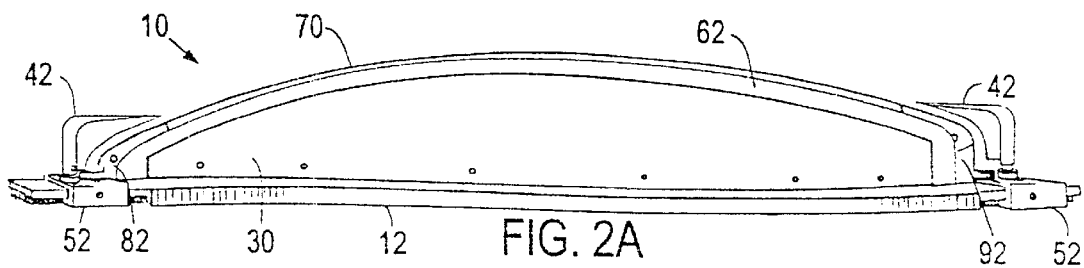
FIG. 2A is a side view of a right-hand mold half wherein shape-defining subparts are assembled to a mold base.

Turning now to FIG. 2A, the right-hand half of a shape-defining mold 10 is depicted with separate shape-defining mold subparts assembled to a mold base 12, which, during assembly, allows the length, rocker curvature and thickness of the shape-defining mold 10 to be adjusted as the separate shape-defining subparts are attached.

Figure 2B:
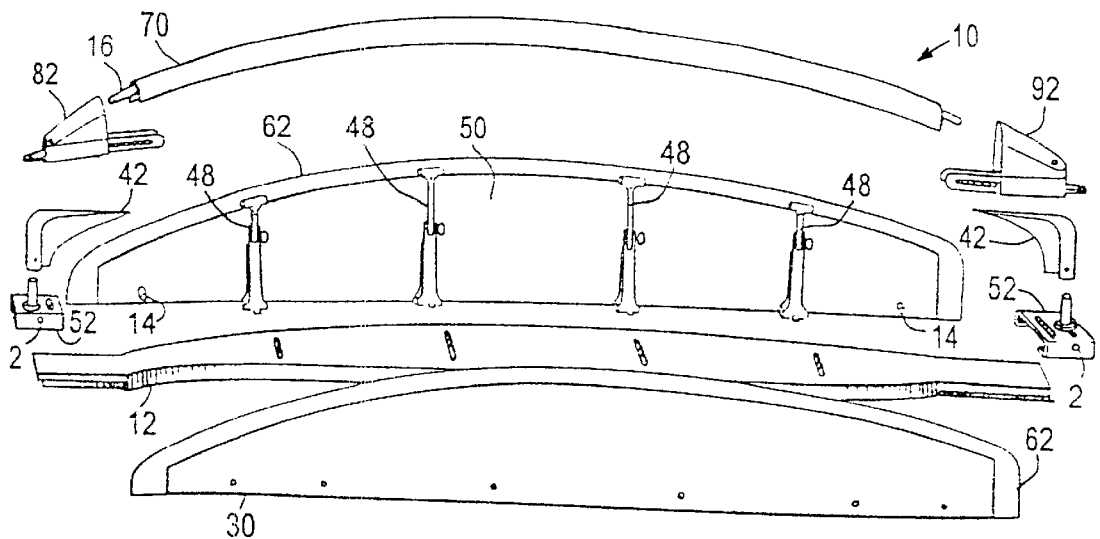
FIG. 2B is an exploded view of the right-hand mold half of FIG. 2A.

FIG. 2B is an exploded view of the mold of FIG. 2A, and is intended to provide an illustration of the basic function of the individual subparts, which may generally be used interchangeably in the various mold configurations disclosed herein. A perimeter rail part 70 is depicted directly above the bottom rocker panel 50; opposite the rocker panel 50 is the deck panel 30, both are shown at right angles to a mold base 12 that, in this example, provides an external reference and surface that allows the curvature of the rocker panel 50, and/or the other sub-parts to be adjusted as they are attached. In the present example, the deck 30 and rocker 50 rocker panels have a complement of transverse (wherein transverse is normal to a longitudinal axis of symmetry of the mold) stiffeners 48 on the respective interior panel sides (30, 50), visible in this view only on the rocker panel 50.

The deck 30 and rocker 50 panels may be attached by bolt or similar fastening device to the base of the transverse stiffeners 48; it will be seen that this also allows the shape-defining surface of the panel (30, 50) to be reversed from male to female configuration. In the present example, the bottom of the transverse stiffeners 48 have a protruding bolts (not visible in this view) that allow attachment to the mold base 12; further, the base area of the transverse stiffeners 48 on two opposing sides may be provided with an adjustment mechanism that controls the distance of the deck 30 and rocker 50 panels from each other, thereby allowing the thickness of the eventual board to be measured as it is set. In this example, the upper part of the transverse stiffeners 48 have sliding rods 24 that attach directly to the fiberglass rod 16 on the inside of the perimeter rail 70, to allow movement and the fixed setting of the position of the rail 70, and thereby accurately modify the board's outline and width. In this example, the structural skeleton of the perimeter rail 70 comprises an articulated rib/backbone arrangement made of molded tooling epoxy composite. The ribs, created by razor cut through the laminate before the resin has fully set, are imbedded in molded rubber for a smooth surface skin and attach to a molded fiberglass or carbon-fiber rod 16 that functions as a backbone; the skeletal structure allows the perimeter rail 70 to flex lengthwise with different rocker curvatures of the rocker panel 50, expand and contract to incorporate the varied thickness of the deck panel 30, and be adjusted to different widths and describe different outline curvatures as well.

To incorporate changes in length, molded nose 82 and tail blocks 92 may be designed so that they slide fore and aft on, for example, a protruding bolt 14; the position may then be secured by tightening a knurled nut (not shown). In this example, the nose and tail components (82, 92) incorporate optional exterior edge or rail pieces designed to rotate on a hinged pin so as to accommodate the changing outline shape of the perimeter rail 70 as they slide fore and aft. The rocker curvature of the nose 82 and tail 92 components (which continues the bottom curvature of the rocker panel 50) of the shape-defining mold 10 may be adjusted when the nose 82 and tail 92 components are attached to the moveable rocker plates 52 provided at either end of the mold base 12. The rocker plates 52 may be designed to provide movement in two different directions—corresponding to both rocker and length—using a moveable threaded nut (not shown) captured in an internal channel or slideway (not shown) so as to position the nose 82 and tail 92 components to the desired rocker curvature, which may then be set by tightening a screw (not shown), for example. The rocker plates 52 may be designed so that they slide fore and aft on the mold base 12; the specific length may then be set by tightening an Allen screw 2 or other suitable mechanism. The edges of the various sub-parts may be very finely tapered to reduce the ridge or gap between the separate individual surfaces so as to minimize any transfer or print-through of minor mold imperfections to the surface of the board in the molding process. This may be accomplished all or in part with a second female mold 20 (not shown in this view) made from molded silicone rubber, for example, or an optional flexible rubber fairing 62, which is depicted in this example running the length of both panels 30 and 50, but can be utilized between any two moveable sub-parts of a shape-defining mold 10 constructed according to the general principles of the present invention.

Together, the configurations of the shape-defining mold 10 described hereinabove will accommodate nearly all the common modifications required within a particular style of board. Certain design modifications, however, such as bottom channels, nose concaves etc., may introduce sufficient compound curvature into the affected subpart to reduce its capacity to bend, and thereby limit its future use. The above design features may therefore be more economically accommodated by creating a one-off mold out of plastic foam, using the internal cavity of the shape-defining mold 10 depicted in FIG. 1A, for example, to produce a foam blank that, upon removal, may have the desired design modifications shaped into the foam by hand; the foam blank may then be used as a male mold or form to define the shape of the exterior skin of the board in the same manner as a male configured shape-defining mold 10 of the present invention.

In the molding of the foam, the female cavity of a shape-defining mold 10 or female component 20 may be used; both molds (10/20) may be used in conjunction with each other and the female mold 20, when made of thermoplastic material, may subsequently be used as part of the finished board. The molded foam may comprise a two-part polyurethane formulation known in the prior custom board-making arts, common procedures in the molding of which include heating the mold and pre-foam to a uniform temperature; further, it may be advantageous for the foam to rise normal to the mold's width. The production process may be designed from the outset to create a foam shape-defining mold 10 that becomes part of the finished board, in which case modifications may be made to the female cavity of a shape-defining mold 10 to allow the molding of bead foams (e.g. EPS, EPP, etc.) expanded by exposure to steam, and for the foam to be molded in a shape-defining mold 10 having a modifiable internal cavity.

Figure 3A:
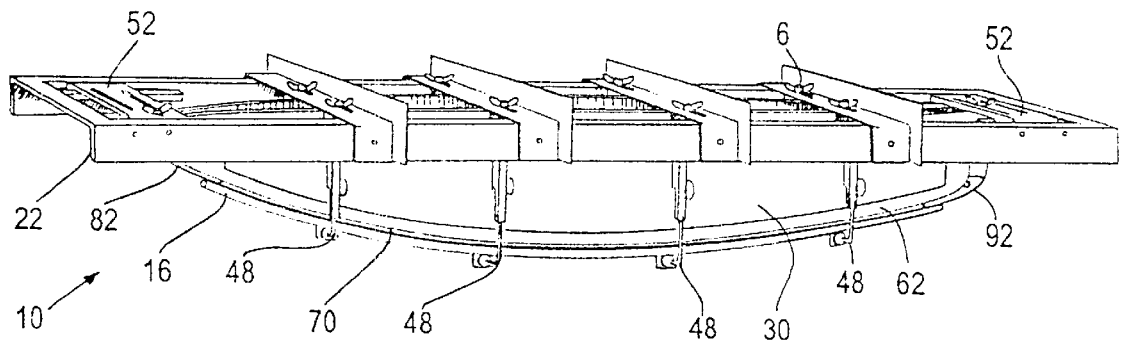
FIG. 3A is a side view of the shape-defining subparts of a left-hand mold half attached to an external frame to create a female mold.

In the present invention, a shape-defining mold 10 having a modifiable internal (female) cavity may be created simply by reversing the orientation of the transverse stiffeners 48 to an external, upright position, which then allows attachment to a frame or other suitable external structure designed for the fixed positioning of the mold's various subparts. As depicted in FIG. 3A, the transverse stiffeners 48 are attached to the exterior of the deck 30 and rocker panel 50; the base area of the transverse stiffeners 48 are rotated to face up and attached to the underside of the frame 22 and to the externally positioned fiberglass rod 16 on the exterior of the perimeter rail 70.

Figure 3B:
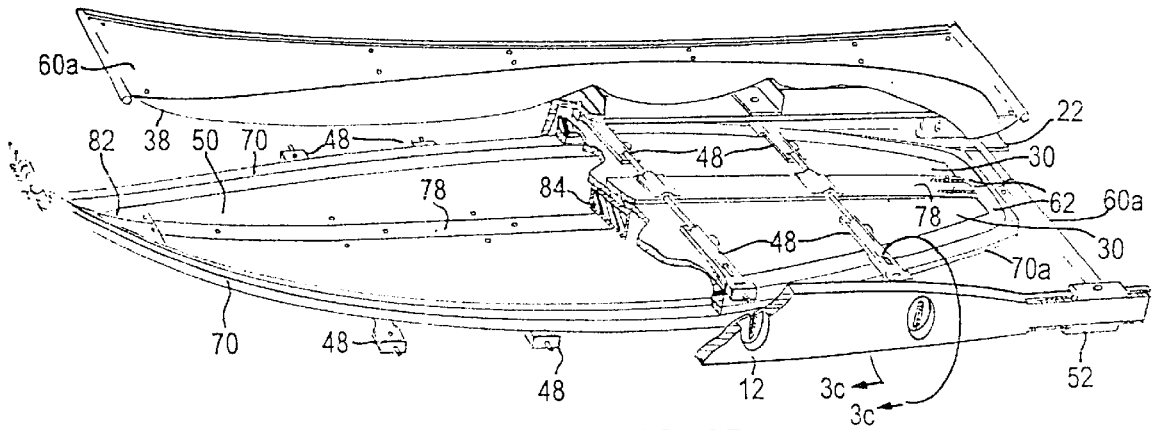
FIG. 3B is a cutaway view of a female mold in top and bottom halves.

In FIG. 3B, the transverse stiffeners 48 are depicted in a horizontal position, which allows the creation of a female mold divided into top and bottom halves. In the present example, the deck and rocker panels (30, 50) attach to a center joining flange 78, the sliding rods 24 run through the center joining flange 78, and the base of the transverse stiffeners 48 attach to a mold base 12, external frame 22, or an equivalent external reference or positioning structure. It will be readily apparent that such external positioning devices as used may be divided into upper and lower parts (not depicted) to facilitate setting the lengthwise curvatures of the deck and rocker panels (30, 50), which may be set using a template (not shown) or, as illustrated, to an interior shear web 84 incorporating spacers 84*a* corresponding to the thickness of the subsequent molded skin or similar structure. Design features such as bottom channels, bottom concaves, etc. may be produced by temporarily positioning or affixing a molded rubber, foam rubber, or synthetic plastic foam "blanket" 34 having the desired configuration(s) to the female surface of the rocker panel 50 prior to molding.

Figure 3C:
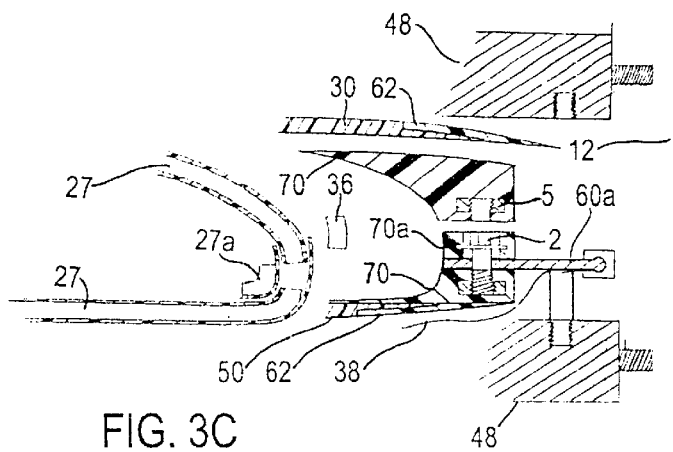
FIG. 3C is a cross-sectional view taken along lines 3c—3c of FIG. 3B.

The perimeter rail may be set by a variety of devices, including a template 60*a* which may incorporate a layer of material 38 that can be attached to the exterior (male surface) of the deck or rocker panels (30, 50) which, by creating an airtight barrier, permits air to be evacuated from the female surface of the mold to the space created therebetween when used in a vacuum thermoforming process. To accommodate thickness changes, the perimeter rail 70 may be one-piece, with its curvature thereby enclosing a smaller area (not shown), or be divided into upper and lower parts at a point of greatest breadth, and provided with a rail spacer 70a as shown in FIG. 3C, so as to allow an indeterminate edge to be incorporated between the upper and lower sides. This allows a skin material, such as a skin core 27 of high-density thermoplastic foam, to be molded oversize. In the initial (thermoform) molding of the skin core 27, a double thickness or back-up rail piece 27a may be created; after the spacer 70a is removed, the skin core 27 may be evenly cut to match the edge of the perimeter rail 70. The trimmed foam 36 may then be temporarily reattached and, with the additional rail piece 27a pinned to the bottom skin core and acting as support, the deck skin core 27 may be brought down over the bottom skin core 27; the trimmed rail piece 36 may then be pinned through so it attaches to the deck skin, and thereby accurately mark the position where the two sides will subsequently meet. Prior to applying the laminate, the trimmed foam 36 piece(s) may be taped and temporarily reattached and thereby serve to mold a curved shape into the laminate at the perimeter rail, which may be razor-trimmed after the laminate gels and has taken an initial set to create an overlapping, interlocking rail configuration as shown; the backup rail piece may be laminated into the interior side for an extremely strong, lightweight, double sandwich rail. It is noted that the interlocking principle when used with a male shape defining-mold 10 turns the male radius at the perimeter rail into an indeterminate edge, and that the rail joint can be neatly trimmed to allow clear or tinted resins to be used in the laminate for an aesthetically pleasing appearance.

It will be readily apparent that the basic design depicted in FIG. 3B, wherein the mold base 12, frame 22, or other equivalent attachment configuration parallels the mold's longitudinal axis of symmetry along a perimeter edge, may be adapted to create other useful structures in the production process, such as an adjustable rocker table to accommodate the lengthwise curvatures of the top and bottom surfaces of a foam shape-defining mold 10, or a shape-defining mold 10 such as that depicted in FIG. 1B. In the example depicted in FIG. 4A, the rocker table 18 may be designed both as a jig fixture and to be vented and in fluid communication with a source negative pressure such as a vacuum pump in order to hold and position the mold 10 as it is adjusted. The rocker table 18 may also replace the rocker panel 50 of a mold configured in top and bottom halves, such as the example depicted in FIG. 3B, which allows a male surface to be used to mold the deck, while a female lower rail half is used to mold the lower half of the board, thereby combining male and female mold configurations in the vacuum-thermoforming process.

The "rocker" or lengthwise curve of the table 18 may be set to the desired curvature by an adjustment structure at the perimeter as in FIG. 3B, or from the underside using a series of spring-loaded bars (not shown) that support the plane of the table 18 along its length, and tightening a worm gear mechanism (not shown). Assembly of the subparts of the shape-defining mold 10 may then commence by clamping the rocker panel 50 to the table 18 by using an extension (not shown) on the adjustable hinged T-squares 54 in the center of the table 18, or by vacuum. By placing the respective centerlines of the two mold halves 10 along the table's 18 outside edge, as depicted, the curve of the rocker panel 50 may be set by attaching the mold base 12 (or the frame 22, pictured directly below the mold base 12); as the subsequent subparts are assembled, they may be checked for accuracy and a side-to-side match using the adjustable hinged T-squares 54 or a similar device. Alternatively, the adjustable T-squares may be removed, a source of vacuum supplied through the apertures, and the central portion of the rocker table 18 used in a vacuum thermoforming process, using a foam shape-defining mold 10, for example, or a shape-defining mold 10 as illustrated in the example of FIG. 1B. In the upper portion of FIG. 4A, one mold half 10 is shown assembled to the mold base 12 and ready to be removed.

Figure 4A:
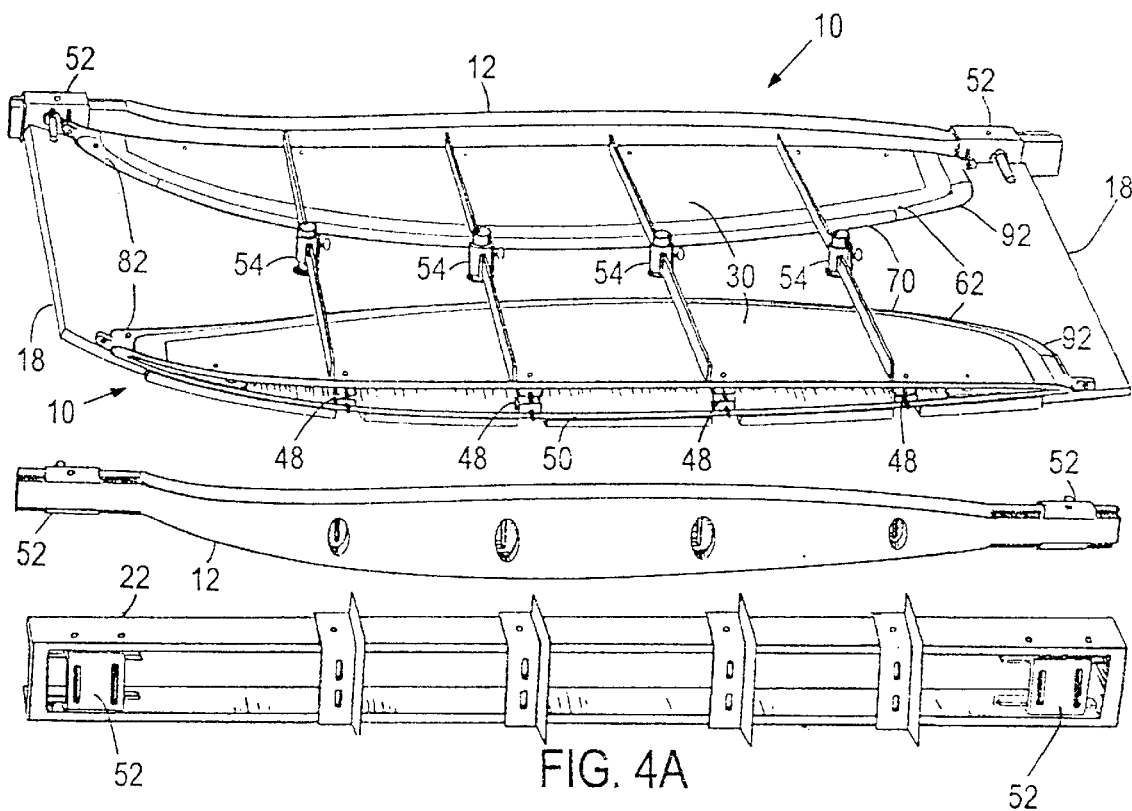
FIG. 4A is a perspective view of a jig-fixture or "rocker table."
Figure 4B:
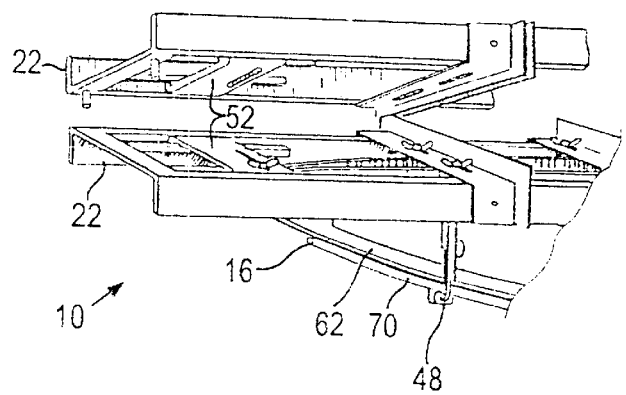
FIG. 4B depicts a frame design that facilitates matching opposite sides.

Accurate alignment and match between two opposing sides may also be facilitated using a stand (not shown) specifically designed for the purpose of supporting a mold base 12, frame 22, or like reference/attachment structure; principles may also be employed similar to that illustrated in FIG. 4A, which depicts a frame 22 designed so that both sides match and fit precisely together. To facilitate matching the two sides during assembly, the base of the transverse stiffeners 48 may be fitted with washers 8a having locating pin(s) designed to fit into matching aperture(s) on the base of the transverse stiffener 48 on the opposite side, shown in the more detailed depiction of the design of the transverse stiffeners 48 in FIGS. 5, 6A, and 6B.

Figures 5, 6A, 6B:
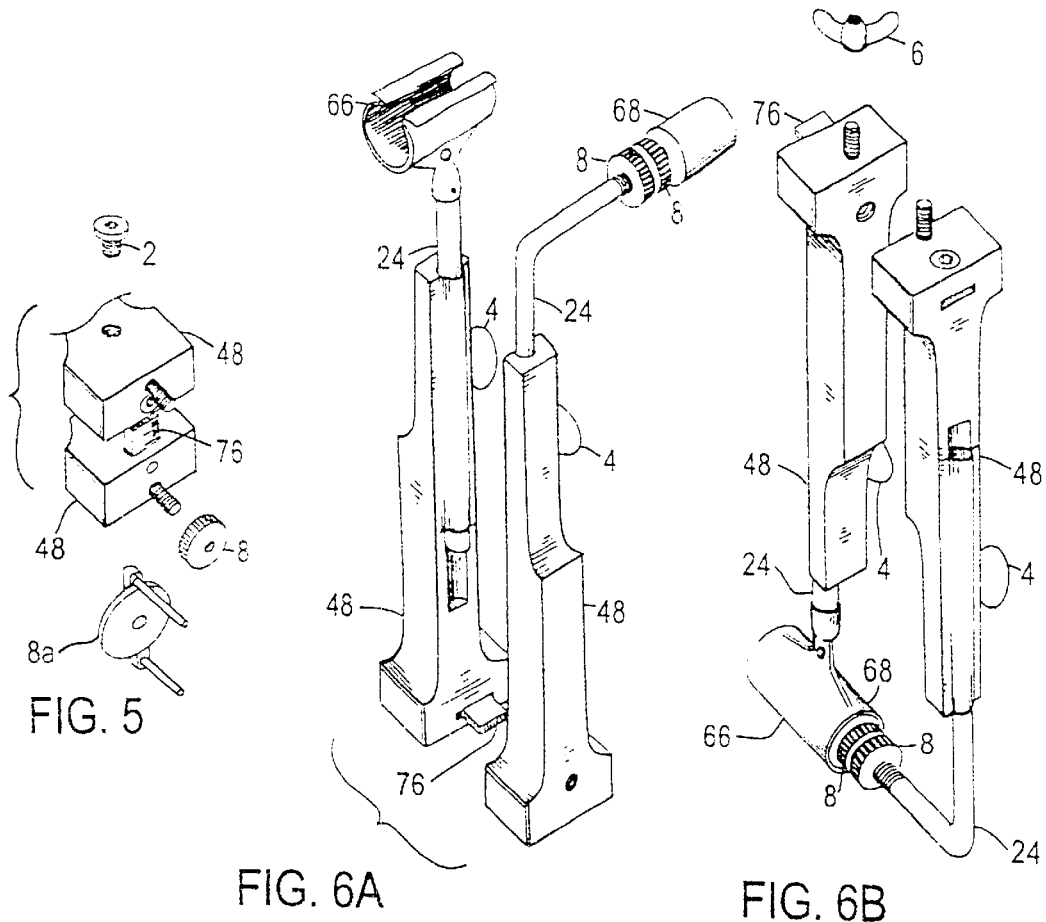
FIG. 5 is a partial view of the base area of two transverse stiffeners.
FIG. 6A is a perspective view of two transverse stiffeners in an upright position, its usual attitude in the interior of a male configured mold.
FIG. 6B is a perspective view of two transverse stiffeners in the reversed orientation used to create a female mold.

The partial view in FIG. 5 shows the base area of two transverse stiffeners 48 and depicts an Allen screw 2 that may be utilized to attach the deck 30 and rocker 50 panels, and a knurled nut 8 that, in this example, is used to attach the respective transverse stiffeners 48 to the mold base 12. The base may be provided with a measuring device 76 that also serves as an adjustment mechanism; positioning devices, such as the washer 8a may be designed with locating pins made to fit into positioning apertures in the bottom of the transverse stiffeners 48 on the opposite side (not shown).

FIG. 6A shows the transverse stiffeners 48 in an upright position, corresponding to the interior position when transversely oriented to the width of a male configured shape-defining mold 10 depicted in FIG. 2A, for example, and depicts an attach point 66 designed to hold the fiberglass rod 16 on the interior of the rail 70. The adjustable rod 24 may be moved and its position set by tightening a wing screw 4; the movement of the rod 24 positions the perimeter rail 70, and allows accurate modification of the board's outline and width. FIG. 6B depicts the transverse stiffeners 48 in a reversed position matching that shown in FIG. 3A—the base area is facing up for attachment to an external frame 22 and the transverse stiffeners 48 are positioned to be attached to the exterior of the deck and rocker panels (30, 50); the adjustable bars 24 are rotated so the rubber bushing 68 fits into the attach point 66; the two knurled nuts 8 tighten to the attach points on the fiberglass rod 16 on the exterior of the rail 70, and thereby allow its position to be secured. It will be readily apparent that the fastening devices suggested herein are in no way presented in a limiting manner, and may be replaced with any number of mechanical fasteners having an equivalent function; other devices, such as spring clips, cam locks, worm gears, and similar fastening, locking and adjustment mechanisms may be deployed, and may perform functions not specifically described herein. Further, the number of fastening and adjustment devices such as transverse stiffeners 48 may be added where needed or omitted; their functions may be divided and performed by separate individual devices; configurations may also be provided to modify additional curvatures such as the board's transverse deck crown, bottom "vee" or belly, for example. In like manner, mold materials, configurations and subparts may be combined, interchanged, and embody modifications not specifically described herein without departing from the spirit and scope of the invention.

In the present invention, the productivity of the mold is enhanced by its capacity to produce a plurality of different shapes, and by the rapid mold cycle of quickly formed thermoplastic material. As previously discussed, the thermoplastic may also be used to function as a mold and reduce the mold cycle of fiber-reinforced plastic—the stability provided by the molded thermoplastic against the fiber-reinforced plastic as it hardens allows removal from the (expensive) shape-defining mold 10 before the resin has full cured. The thermoplastic female mold 20, or other plastic release material, may also be effectively used to break the bond between wet laminate and the male or female surface of a shape-defining mold 10 (or a female mold of the prior art) so as to reduce the mold cycle and/or allow the board to be successfully removed. In addition, after thermoplastic material is used as a mold, a second cycle may be used to heat the material to a deformation temperature again, so as to cause it to return to its original shape, which will allowing polishing, reconditioning etc. and subsequent reuse. This second, inexpensive mold creation/reuse cycle is especially useful in creating female thermoplastic mold components 20a for use in localized areas, for example to mold fiber-reinforced composite material to strengthen the base area in glass-on fins, around fin boxes, mast tracks, etc. and to mold lengthwise reinforcement such as spar caps and shear webs directly to a foam shape-defining mold 10, thus creating a shape-defining structural core 40 (pictured in FIG. 10A) which may be used to mold a finished thermoplastic exterior skin in a single, one-step molding process. Due to the many possible thermoplastic mold combinations, and the variety of possible vacuum thermoforming techniques described herein, a detailed illustration/description is not presented to avoid obscuring the invention, but may be readily ascertained by persons of skill in the art following the general procedures outlined herein.

3. Vacuum Thermo-Formed Molds and Skin Structures

Thermoforming methods applicable to the present invention use heat and pressure to mold a thermoplastic material into an array of diverse items ranging from aircraft canopies to food containers. Heat is often supplied in a well insulated chamber such as an oven, or in a pressure vessel (e.g. an autoclave) by conventional electrical heating elements, heat blankets, high-heat transfer fluids (e.g. propylene glycol or the like), with pressure provided by a two part mold press, fluid or gas filled bladders or similar molding devices. Using vacuum thermoforming techniques, the thermoplastic sheet is usually clamped to a frame, heated to a deformation temperature, drawn down over a mold where vacuum is applied to evacuate air between the mold and thermoplastic sheet, which causes the atmosphere to press on the exterior of the thermoplastic sheet and thereby conforms it to the shape of the mold.

In the present invention, the thermoplastic material may be drawn down over a (male) mold; be vacuumed into a female cavity, or remain stationary, in an oven or pressure chamber such as an autoclave, for example, and the mold moved into contact with the heated thermoplastic sheet/frame and formed. Vacuum may be drawn through or around the mold; the frame may be curved to match a specific rocker curvature, and be made flexible to accommodate a plurality of different curvatures, such as those presented by the different configurations of a shape-defining mold 10 or rocker table 18, for example.

To avoid excessive stretching or contraction of material in the thermoforming process, the thermoplastic sheet may be attached to a second layer of material that is held within the frame, rather than the frame itself; the thermoplastic sheet may also be vacuumed between layers of sheet material such as high-elongation release film, vacuum-bag material, elastomeric rubber or the like that are held to or supported within the frame. The thermoplastic sheet may also be held by clamps bonded to an elastomeric rubber that is then fixedly attached to the frame so that the rubber, rather than the sheet, will stretch during the forming process. This is particularly advantageous using certain types of thermoplastic sheet foam, which will conform to gradual curvature—such as the shape of the board divided into top and bottom halves—but may break or separate when attached directly to a frame because of a limited capacity to stretch during the thermoforming process. When the board is molded in right and left halves, the foam's limited capacity to stretch and compress in the molding cycle becomes a particular problem. Because the board's outline is as much as ten percent longer than the measurement lengthwise at the center, and the severity of the compound curvature at the nose and tail of the board, the foam tends to fold in large uncontrollable folds and wrinkles, rather than conforming to the exaggerated curvature that is usually present at either end.

Figures 7A, 7B:
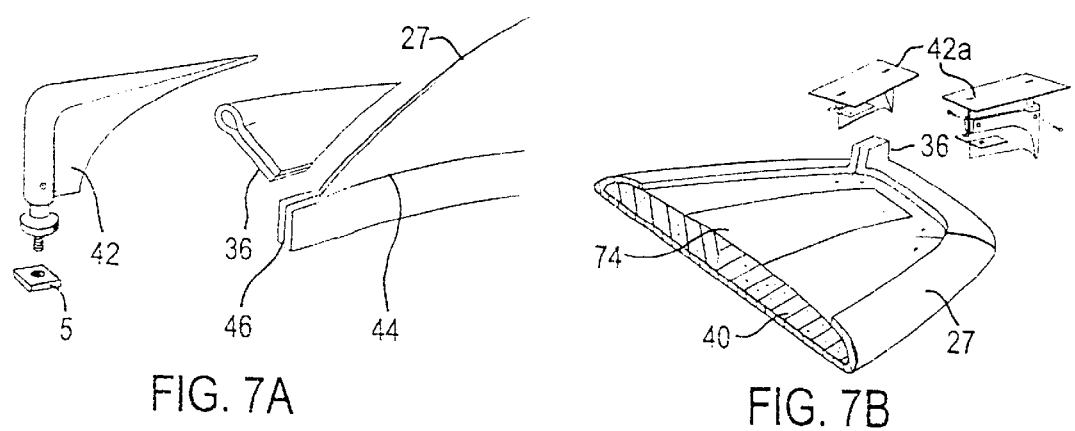
FIG. 7A is a perspective view of a mold extension and a partial view of the nose area after thermoforming a high-density foam skin core.
FIG. 7B is a cutaway view depicting smaller mold extensions used in the tail area.

The general principle used in the present invention to prevent these wrinkles is by providing a simple, rectangular mold extension to the nose and tail areas to make the outline and centerline measurements more equal. Referring to FIG. 2A, an example of a mold extension 42 is depicted at either end of the shape-defining mold 10; the mold extension 42 is attached to the rocker plate 52 on the mold base 12 at either end of the shape-defining mold 10. FIG. 7A provides a closer view of a mold extension 42 and shows a threaded nut 5, normally captured in an internal channel in the rocker plate 52 (not shown), and provides a more detailed, partial view of an example a molded foam skin core 27 removed from the shape-defining mold 10 after forming; the trimmed foam 36 shows how the foam folds smoothly over the upper portion of the extension 42, makes the sharp bend at the mold's perimeter rail 70, then conforms to the top 30 and bottom 50 of the mold (in this view the molded skin core 27 is removed from these surfaces). As depicted, the molded skin core 27 ends slightly beyond the eventual centerline 44 of the board.

After forming, the folded foam area 36 may be removed with a razor and the foam skin core 27 lightly sanded to fair in the surface. In the present example a small tab 46 is depicted; the tab 46 may be created intentionally during the trimming of the molded skin core 27 to provide an area that can be clamped to ensure the two sides of the molded skin core 27 are bonded together again during lamination. As those with skill in the art will appreciate, the above principles may be employed generally in other areas of the molding process, for example, to mold a thermoplastic sheet completely around the exterior of the board/mold, to create continuous top and bottom surfaces with an opening along one perimeter edge. Alternatively, the board may be molded as depicted in FIG. 7B, where a much smaller mold extension is provided to prevent uncontrolled wrinkling at either corner of the tail area when the thermoplastic skin is molded around the bottom of a shape-defining structural core 40 and the two halves joined on the deck. As illustrated, the mold extension 42a is designed to be inserted directly into a foam core and is two part; the flat upper area may be attached to a rocker table (18, not depicted in this view) for example, and may provide additional stability for the shape-defining structural core 40 (or foam mold 10, not shown) as the deck rests on nesting material on a rocker table 18 (pictured in FIG. 4A) during the thermoforming process.

4. Application of Laminate and Completion of the Board

The present invention, while allowing liberal use of substitute materials to complete the board, is directed to custom board production and as such, may use the room temperature curing (RTC) polyester, vinyl-ester, and epoxy fiber-resins and fiber-reinforcements familiar to a person of skill in the custom board-making arts. As noted hereinabove, in an advantageous embodiment of this invention, the board is molded in right and left halves so that the laminate may be applied with the width of the mold(s)(10, 20) and the foam skin core 27 at right angles normal to the worktable. This allows gravity to provide an effective aid in removing excess resin from the laminate, but makes the initial saturation of the fabric difficult because the resin tends to run off more quickly than the cloth can be saturated. This drawback may be turned to advantage, however, because it makes it possible to use a mechanical fabric impregnator to quickly pre-saturate the fiberglass cloth.

Figure 8:
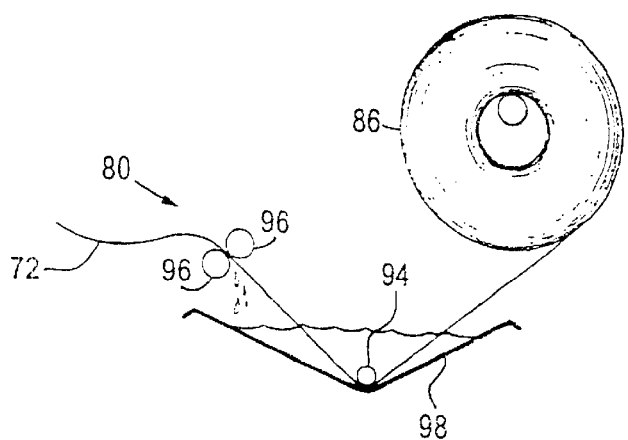
FIG. 8 is a profile view of a mechanical fabric-impregnator.

A profile view of a fabric impregnator 80 is provided in FIG. 8 to better illustrate the general principles of its use. The bolt of reinforcing fabric 86 is depicted above the resin bath 98; the reinforcing fabric 86 is unrolled directly from the bolt, immediately saturated as it is submerged and drawn around a roller 94 in the resin bath 98, it then runs between two nip rollers 96 so that the excess resin is removed and the correct amount is left in the laminate 72.

Figure 9:
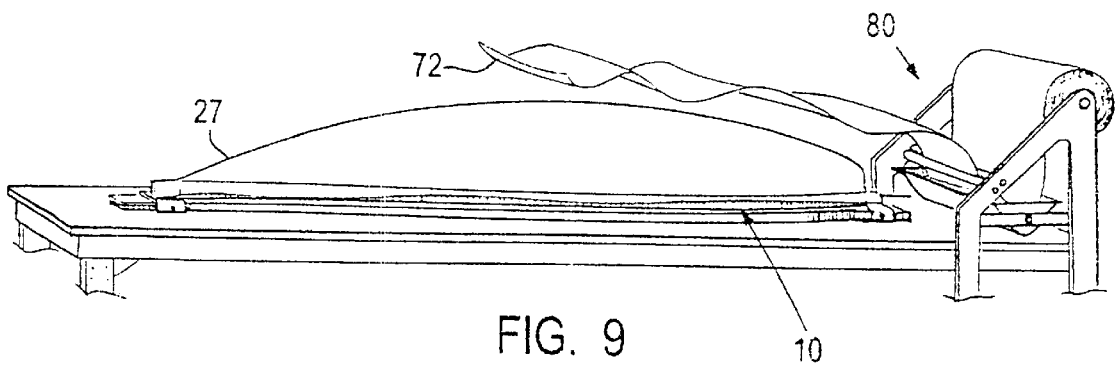
FIG. 9 is a view of a molded skin core being laminated.

FIG. 9 is a perspective view of the reinforcing fabric 86 being run through the fabric impregnator 80 and the laminate 72 being drawn up into place to be trimmed on the surface of the mold 10 and pre-molded skin core 27 To be used effectively, it is preferable for the items laminated by the impregnator 80 to be lightweight and moveable, so that the fabric 86 can be run continuously through the fabric impregnator 80 and a series of articles laminated in rapid succession while the resin remains liquid in the bath. To prevent premature hardening the gel time of the resin may be extended, preferably to about an hour. In the present invention, the longer cure/mold-cycle and major loss of productivity that normally ensues is largely removed, however, because the manufacturing area requirements during cure are minimal—the board may be placed so its thickness, rather than its width consumes space during hardening—and the cure time of the multiple boards that can be laminated in a single run will be an average of the gel time of the resin, or roughly half an hour using the aforementioned example.

The complete mechanical saturation also makes practical the use of difficult to saturate, tightly woven, high-strength fiberglass fabrics used in thermosetting pre-pregs; these densely woven fabrics reduce resin requirements to about thirty-five percent for complete saturation—from the fifty percent found in the easily saturated, loosely woven boat or tooling fabrics used in the hand laminated methods of the of the prior art. Useful examples, using weave numbers shared by the various manufacturers of fiberglass reinforcing fabrics (e.g. Hexcel, Burlington, etc.), include #7781, an eight-harness satin weave weighing 8.71 oz. per square yard, and #120 crowfoot weave weighing 3.70 oz./yd. Fabric impregnators are commercially available from Gougeon Bros. in Bay City, Mich.

A reduction in resin content is also ensured by using vacuum bagging techniques; the following example is set forth as applicable to the present invention, in which a high-strength structural sandwich skin is created by placing a first layer of vacuum-bagging material over the exterior of the shape-defining mold 10, followed by a first layer of laminate, followed by the pre-molded foam skin core 27, additional layer(s) of laminate that form the exterior of the structural sandwich skin, the female mold component 20; the addition of the exterior of the vacuum bag then completes the assembly. When the bag is sealed and the air is withdrawn, the pressure of the atmosphere presses on the laminate and, in the present invention, combines with gravity to leave an absolute minimum of resin within the fiber.

It will be readily apparent that when a foam shape-defining mold 10 or structural core 40 is used the foam may be bonded directly to the interior of the sandwich and become the interior core of the finished board. The laminating step may also be designed to create a joining flange, which may be normal to or parallel the width of the board and incorporate at least one right- or oblique angle; this angle may be used as a form to hold additional unidirectional fiber-reinforced laminate as it cures. A recessed area may be created on the inside or outside surface of the either side for the same purpose and/or to accept the flange. In addition, a tongue-and groove, shiplap, or similar mating surfaces may also be molded, routed or shaped by various subtractive methods, so as to strengthen and/or facilitate the jointing or bonding of the two opposing sides; further, the shear web and/or spar may incorporate traditional materials in their structure such as wood.

With the stability provided by the two combined surfaces, the laminated skin core/female mold 27/20 may be removed from the shape-defining mold 10 before the resin has fully cured, or the foam shape-defining mold/structural core 10/40, when used, may become part of the finished board; in either case, when the board is molded in right and left, or top and bottom halves the mold-cycle and/or the expense of the tooling in the fabrication of a high-strength structural sandwich skin is reduced to levels competitive with low-cost methods of the prior art. After the resin gels and has taken an initial set, the laminated skin core 27 may be razor trimmed and excess laminate, or foam/laminate material, removed along the longitudinal centerline 44 of the board; the razor will leave a sharp straight edge suitable for subsequent joining.

Figure 10A:
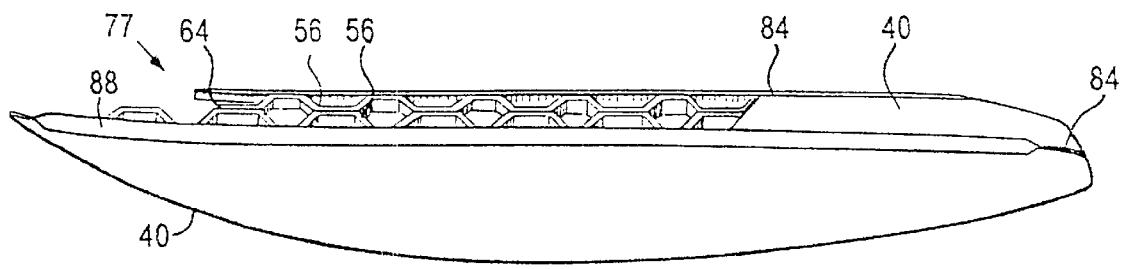
FIG. 10A is a perspective view of various interior cores of the board.

FIG. 10A provides an illustration of a variety of interior core materials and structures including longitudinal shear webs 84 and spar cap 88 material molded into a shape-defining structural core 40 using a thermoplastic female mold 20 of the present invention. The foam areas in the interior may be bead foams (e.g. EPS, EPP) molded by a female shape-defining mold 10 and/or molded directly to the interior cavity of a pre-molded board skin using a steam chest, for example, pre-expanded foam beads may be coated with a suitable binder and then deposited into the interior of the laminated skin core 27 and partially compressed during cure of the binder by the insertion of a third member—either specially designed for the purpose—or by use of an interior member such as a shear web 84 that becomes part of the finished structure. A source of positive or negative air pressure may be provided in the interior by a vented tube or pipe placed along the inside of the perimeter rail, which may be later removed, or by perforating and venting a box-beam, shear web, interior bulkhead etc. and providing fluid communication with a source of air pressure which, depending on configuration, may be supplied through apertures designed to accept plugs for leashes, footstraps, fin-boxes, mast-tracks or the like.

In the interior, any of the synthetic foams (e.g. polyurethane, polyethylene, EPS, EPP, polystyrene, polypropylene etc.) may be used and, where appropriate, molded, shaped, or cut, using known die cutting, wirecutting, milling, routing and shaping techniques, which may be numerically controlled (CNC) where applicable. The above foams may be made lighter by removing additional material by die cutting, a punch press, etc. to create a partially hollow, chambered foam core (not shown). The honeycomb foam core material 64 depicted may be created from sheets of foam heated to forming temperature and then thermoformed into the initial half-hexagonal/half-cellular configuration, the material may be cut into strips 56 and then joined together to form a cellular foam-honeycomb core 64.

Figure 10B:
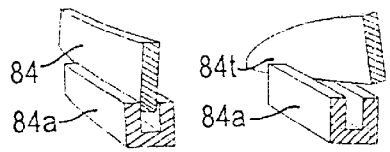
FIG. 10B is a view of an adjustable, interlocking shear web.

Referring now to the example depicted in FIG. 10B, the longitudinal shear webs 84 may be made adjustable by creating channeled foam base areas to create a two part interlocking structure (84/84a); glue may be applied to both surfaces and to the interior of the board and while the glue is still wet, the pieces may be moved up or down or otherwise positioned to affect a perfect fit and bond in the interior (not shown). The same principle can be used with transverse bulkheads or ribs (84t/84a), compression inserts (not shown), or any other interior structure. Obviously, a wide variety of other configurations may be substituted and will perform an equivalent function, and are easily molded directly to the surface of a shape-defining mold 10 using vacuum thermoforming techniques. The longitudinal channel interlocking structures may be advantageously employed in bonding the board's upper and lower sides, and additional laminate may be applied where needed in the aforementioned structures to create a structural sandwich to better resist high compression loads and form a much stronger interior core.

Figure 11A:
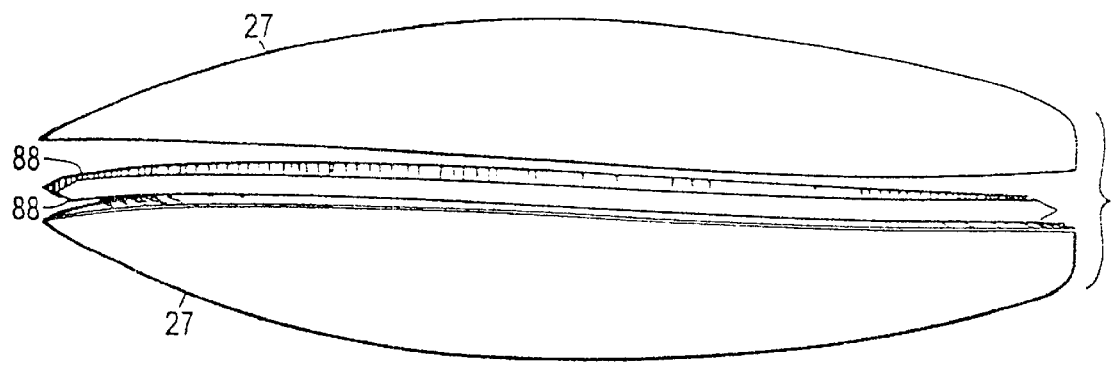
FIG. 11A is a view of two board halves being bonded to a reinforcing flange.

Fins, boxes for same, mast-tracks, plugs for foot-straps, leashes etc. appropriate for the end use of the board may be attached using conventional methods; access to the interior prior to the introduction of the interior core allows a backup structure to be added concurrent with the bonding. In FIG. 11A, the two halves 27 of the board are shown before being joined, during which time a longitudinal spar may be created using pre-cured plastic composite strips 88 that serve as initially as joining flanges in the bonding procedure, and subsequently as longitudinal reinforcing flanges or spar caps in the finished structure.

Figure 12:
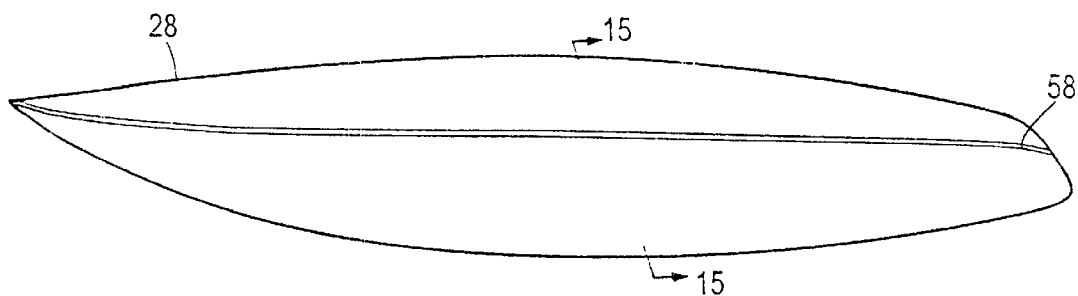
FIG. 12 is a perspective view of a completed board.
Figure 11B:
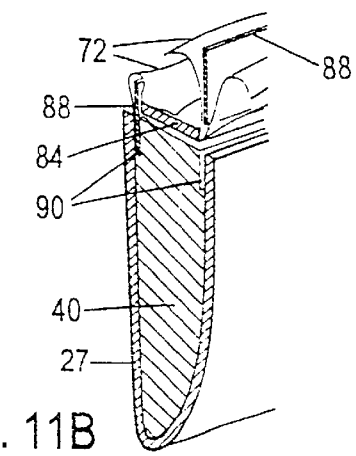
FIG. 11B is a closer, cross-sectional view of FIG. 11A.

FIG. 11B provides a cross-sectional view of an example of bonding two halves, where a knife or other appropriate tool (not shown) has been inserted between the molded sandwich skin core 27 and the foam of a shape-defining mold 10 that has become part of the interior core; sufficient foam has been removed to create a slot 90 for the pre-cured composite top and bottom spar caps/joining flanges 88, which may incorporate high-strength unidirectional S-glass, Kevlar®, carbon fiber etc. running lengthwise, in a high-strength, high-temperature curing epoxy fiber-resin, or one of the extremely high-strength pre-cured composite materials made by Gordon Plastics in San Marcos, Calif., or Neptco in Pawtucket, R.I. The top and bottom spar caps 88, wrapped with fiberglass 72 saturated with the bonding resin, are tucked into the top and bottom slots 90, the excess fiberglass 72 that comes out of each slot 90 provides the structural wall for the foam core of the shear web 84; the two halves are bonded together to form the completed board 28 shown in FIG. 12.

Figure 13:
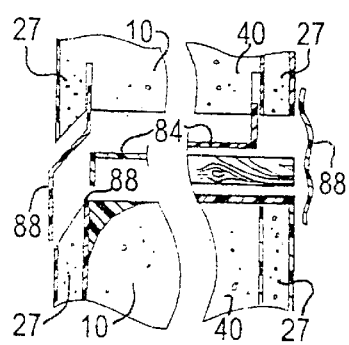
FIG. 13 is a cross-sectional view of various joining flanges.

FIG. 13 provides a cross-section view of various oblique- and right-angles that may be used in the joining/reinforcing flange 88 that aids in bonding the two sides; the angles are easily created in fiber-reinforced plastic using a thermoplastic mold 20 of the present invention. FIG. 14A depicts the shear web 84 and spar caps 88 forming an I-beam with the gap 58 created by the shear web 84 in the bonding operation filled with high-strength fiber such as Kevlar®, carbon-fiber or similar material; also shown is a joining flange 88 of fiber-reinforced plastic laminate on the exterior to seal the surface. FIG. 14B depicts the spar caps 88 and shear webs 84 in a box-beam configuration, The shear web 84 may also be made circular or C-shaped in cross-section (not shown) with an articulated mold structure such as that used to create the monocoque perimeter rail as depicted in FIG. 15, which shows a view in cross-section taken along lines 15—15 in FIG. 12.

In the present invention, the high strength that can be developed in the spar, and the enhanced tensile, compressive and flexural strength brought about by the minimal resin content of the laminate, reduces the total amount of structural material needed to carry the tensile and compressive loads in bending; the use of the female thermoplastic mold 20/20a allows additional material to be applied where the bending moment is greatest. This material may be confined primarily to upper and lower longitudinal reinforcing flanges, the high strength of which may be used to provide the basis for exceptionally stiff longitudinal reinforcement which will allow resilient foams to be incorporated into the structure of the board. The novel board configurations created when resilient polypropylene, polyethylene or polyurethane foam replaces the rigid foam formerly used in the skin or interior core will allow the board to bend further before breakage and absorb high-point and impact loads without damage, while allowing the flexural characteristics of the board to be better tailored to specific design needs so as to eliminate the performance problems of the prior art.

a. Substitute Materials and Structural Configurations

Novel uses of resilient foam occur when an impermeable, closed cell polyethylene, polypropylene, polyurethane or polypropylene bead foam is used to replace rigid foams used in board structures such as those depicted in FIG. 10A and FIG. 10B for example. To be used successfully, resilient foams must be incorporated into the board in a way that minimizes the adverse effect these foams may have on the board's performance. Referring now to FIG. 16, a novel use of resilient material incorporated within the structure of the board is depicted in which the structural layer of fiber-reinforced plastic 74 is connected with material serving as a shear web in the interior core and directly beneath and/or integral with fiber-reinforced laminate 72 and conventional skin coverings 72a such as paint, gel coat, fiber-reinforced plastic, thermo-formed plastic sheets of PC, ABS, PMMA, etc. and adhesives and adherends which may be combined in a multi-layered skin.

The structural flange 74 may be molded using a thermoplastic mold 20/20a of the present invention, which will allow substantial squeegee pressure to pass through to the laminate for a minimal resin content, and will allow the width of the flange to be increased and multiple layers applied towards the center of the board where the bending moment is greatest. In contrast to prior art boards that incorporate resilient foam into the structure of the board, the reinforcing flange 74 is placed at or very close to the exterior surface, so that the tensile and compressive loads in bending are carried at the furthest point away from the neutral axis, so as to maximize the strength and overall stiffness of the structure.

The stiffness thereby provided allows the use of resilient foams 110a having "memory," such as polypropylene, polyethylene, etc., in the shear web and/or interior core; it will be seen these materials may be combined with rigid foams to allow the board to bend further before breakage, while retaining sufficient rigidity throughout the rear portion of board so as to minimize undesirable effects on performance. The specific design and placement of material on the board will depend on the intended end use. A highly flexible board will be noticeably slower and hence safer for beginners, but the flexibility along the length of the board can cause rocker changes during actual use which can create control problems that are very difficult for the novice to overcome. To prevent rocker changes, which come primarily as the speed of the board increases, the upper and lower reinforcing flanges may extend around the perimeter to create a monocoque rail that will provide additional shear strength and stiffness through the rear half of the board. To then allow the nose rocker to increase in critically steep or fast sections of the wave—which will tend to slow the board down and allow the novice rider to retain control, material may be omitted both from the lower reinforcing flange 74, the rail, and the upper reinforcing flange 74 as they progress towards the nose. The same principle may be applied using internal (multiple) shear webs, spar caps (88) rigid honeycomb foam 64, or any of the interior configurations depicted in FIG. 10A or FIG. 10B, or by using rigid foam 110 where increased stiffness is desired and confining resilient foam 110a to the nose and rail areas, which will also increase board safety.

The use of rigid foam or honeycomb structures may be used to stiffen the board, which the advanced rider will require—and the structural layer may be used to create a monocoque rail that may be extended along the entire length of the board. To protect the structural layer(s) 72/74 from high point and impact loads, a bonding agent may be used to attach a second layer of resilient foam 110a material and thereby create a layered sandwich skin in which the skin core is a load-bearing layer on the inside. Resilient, impermeable closed-cell foams 110a such as polyethylene, polypropylene, polyurethane etc. may be left bare or receive an exterior covering such as a thermoplastic film or a paint, or receive an exterior load-bearing layer of fiber-reinforced plastic 72 and/or thermoplastic 72a and thereby create a novel, high-strength structural sandwich skin having at least one layer of resilient, impact absorbing foam. In the present invention, the novel use of high-strength fiber reinforced plastic with resilient foam as part of a layered sandwich or structural sandwich skin enhances its impact strength; in the interior core resilient 110a and rigid foams 110 combine with the longitudinal reinforcing flange 74 and structural layers 72 of fiber-reinforced plastic to allows the flexural characteristics of the board to be tailored to meet specific design needs and eliminate flexural problems of the prior art.

Referring now to FIG. 17A and FIG. 17B, the molds and methods described herein are readily adapted for use with expensive thermosetting honeycomb sandwich-core/prepreg skin combinations, as both the shape-defining mold 10 and female mold 20 may be constructed from high-heat tooling epoxy composites and rubber materials compatible with an elevated temperature, pressurized cure; or in an advantageous embodiment of the present invention, molds made from these expensive materials may be reserved and used for a much shorter duration, higher temperature post-cure only, while the inexpensive thermoplastic female mold/foam shape-defining molds (10/20) of the present invention are used to pre-cure or partially cure thermosetting prepregs— these inexpensive molds may be made from material having a maximum service/processing equal to or above the 200° to 250° F. minimum temperature normally required by thermosetting resins. The less expensive thermoplastic mold materials (for molds 10 and 20) offer simplified mold construction and board production, as two honeycomb cores 27h may be pinned directly to the foam mold 10 and to a flexible, over-expanded (OX) honeycomb 27x rail piece, for example, as they are bonded together to create one side of board. An additional rail-shaped thermoplastic female mold 20a may also be used to temporarily position the pieces as the glue sets.

The thin, substantially flexible female mold 20 also makes it possible to eliminate the expensive prepreg laminate which are normally shipped B-staged, or partially cured, and kept under refrigeration until used in the mold—the inexpensive (thermoplastic) female mold component 20 may be opened or spread sufficiently to allow the laminate to be applied to the interior of the female mold 20; the surface tension of the inexpensive liquid fiber-resin will hold the laminate to the interior of the female mold 20 as it is placed over the exterior of the honeycomb and prevent an excessive amount of resin from running into the cells; the vertical sides of the core/mold aid in this, while allowing a meniscus to develop. A layer of release film, coated with laminate and placed over the exterior of the foam shape-defining mold 10, may be used to adhere laminate to the interior of the core and create the second layer of the structural sandwich. The exterior facing may be made more puncture resistant by using a thicker facing material such as wood veneer(s), plywood (aircraft or marine), a very thin sheet of high-density rigid or resilient plastic foam, any of which may be combined with laminated skin/skin core materials to create a multi-layered sandwich skin. At comparable densities, honeycomb materials such as Nomex®, available from Hexcel Corp, exhibit strength levels several times that of rigid thermoplastic plastic foams which may be used as sandwich cores in this invention, such as PVC Divinycell® and Ester Core® cores available from Diab Group based in De Soto, Tex. Dow Chemical is a major producer of material used to manufacture resilient foams such as polyethylene, polypropylene, etc. which may be incorporated into the body of the board in the novel ways disclosed herein.

In the structural sandwich skin, the sandwich core usually ranges between 0.16–0.25 inches, although it will be readily apparent from the aforementioned examples that considerable variation is advantageous, as the present invention makes possible a number of novel skin configurations by combining disparate skin, skin core, and sandwich core materials of differing thicknesses and densities, and that the layered sandwich skin described herein may include material such as polymethacrylimide foams, liquid pre-foams, prior art fiber-reinforced epoxy and polyurethane foams (U.S. Pat. No. 4,713,032 to Frank), and other core materials suitable for use in or manufactured for use in sandwich construction.

In referring to fiber-reinforced plastic composites used in the board-making arts, a structural sandwich generally connotes a low-density sandwich core with high-density/ strength (relative to the core) facing material on both sides; a "sandwich skin" more often refers to the much lower strength plastic, or foamed fiber reinforced plastic material having an interior of plastic foam, with the low-density foam functioning as a sandwich core in distributing shear tensile and compression over a much greater area on either side. In the board-making arts, the term sandwich skin is also used to describe for example wood-veneer boards, wherein the lower-density material is on the outside, but is used for the much the same purpose—the thickness of the veneer covering (relative to the interior load-bearing layer of fiber-reinforced plastic) spreads and converts high-point and compression loads to tensile loads over a much broader area, resulting in a stiff and strong skin. Because wood is normally classified as a load bearing material, but when used with plastic composites often functions as a sandwich core, in the present invention the nomenclature used to describe the material depends on its position within a multi-layered skin: the term sandwich core refers to the lower density material sandwiched between two higher-strength/density facings; the term skin core (27) may refer to a high-density facing, a low-density material covered by a high-density facing; further, an additional interior skin layer may turn material that is a skin core in one part of the board into a sandwich core in another, and the term skin core will also be understood to include adhesive(s) and bonding agents that function in spreading tensile loads to a broader area in the interior core.

Due to the versatility of the principles and methods disclosed herein, persons with knowledge of the art will appreciate that modifications may be made in mold configurations, in the order and number of manufacturing steps, and the substitution of material used in the construction of the board without departing from the spirit and scope of the invention. Therefore, the scope of the invention is not limited to the specific embodiments described above, but includes the various modifications, alterations and substitution of functional equivalents that might be made by those skilled in the art without departing from the spirit and scope of the present invention.

I claim:

1. A method of producing a board comprising the steps of:
a. providing a shape-defining mold;
b. providing a thermoplastic sheet;
c. heating the thermoplastic sheet to a deformation temperature;
d. applying the thermoplastic sheet to the mold;
e. applying pressure to the thermoplastic sheet to form a molded thermoplastic sheet;
f. joining the molded thermoplastic sheet to a second layer of material to form a skin core;
g. utilizing steps a through f to mold opposite sides;
h. providing material in the interior to support the exterior skin;
i. bonding two sides of the board together.

2. The method according to claim 1 wherein the shape-defining mold comprises synthetic plastic foam.

3. The method according to claim 1 wherein the shape-defining mold is a shape-defining structural core.

4. The method according to claim 1 wherein the molded thermoplastic sheet is used to mold at least one internal skin layer.

5. The method according to claim 1 wherein the interior core is composed of material selected from the group consisting of: low-density foam, expanded bead foam, expanded foam beads, chambered foam, foam having a cellular honeycomb configuration, transverse ribs, transverse bulkheads, shear webs, upper spar caps, lower spar caps, an upper longitudinal reinforcing flange, and a lower longitudinal reinforcing flange.

6. The method of claim 1 wherein the molded thermoplastic sheet in used as a sandwich core in a structural sandwich skin.

* * * * *